INVENTORS
HORACE G. McCARTY
HENRY N. LAUSCH
& BRUCE D. SCHWALM
BY John E. Becker
ATTORNEY

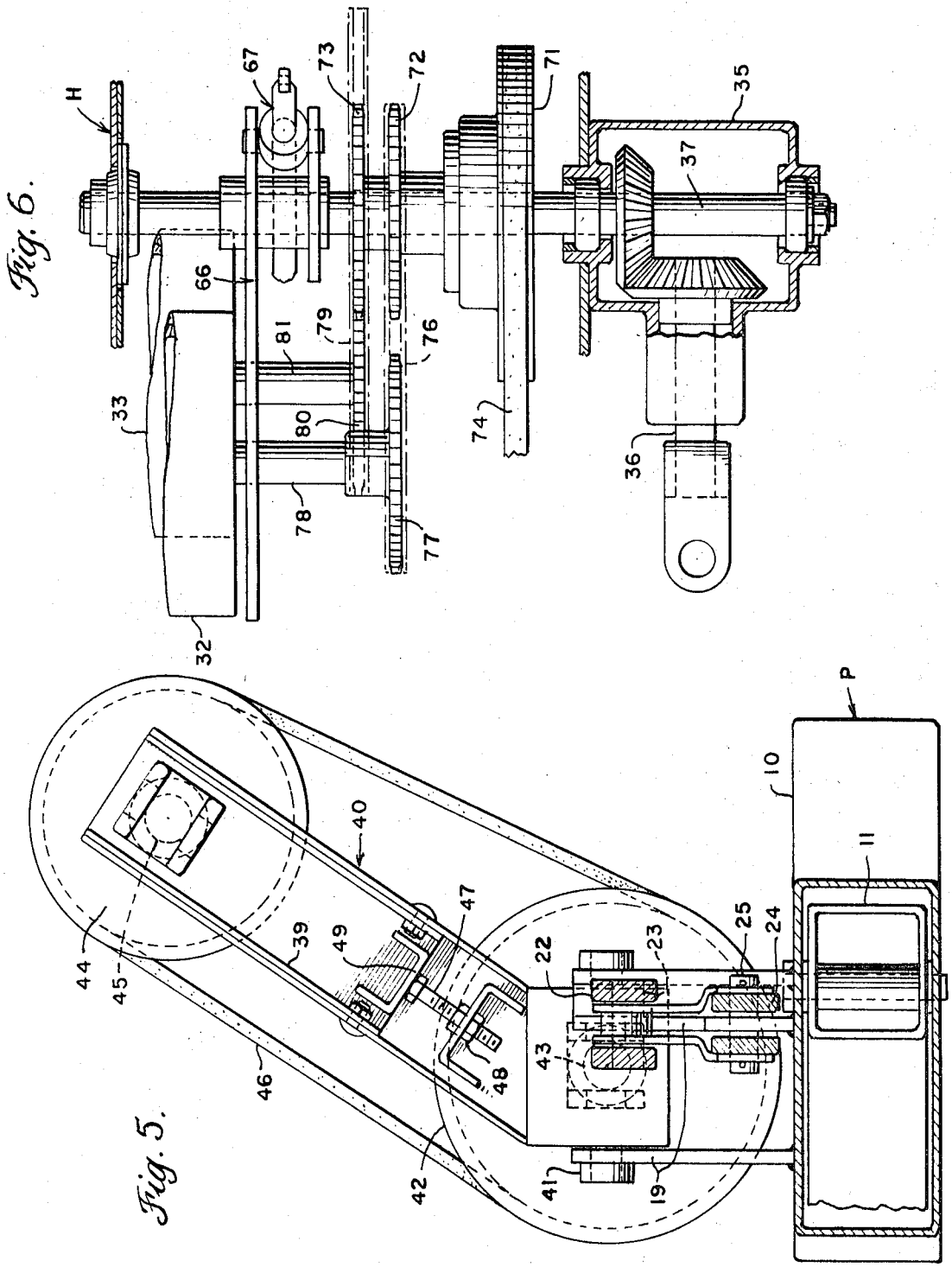

United States Patent Office 3,555,791
Patented Jan. 19, 1971

3,555,791
DRIVE SYSTEM FOR PULL-TYPE MOWER-CONDITIONER MACHINE
Horace G. McCarty, Henry N. Lausch, and Bruce D. Schwalm, Leola, Pa., assignors to Sperry Rand Corporation, New Holland, Pa., a corporation of Delaware
Filed July 26, 1968, Ser. No. 747,901
Int. Cl. A01d *43/10*
U.S. Cl. 56—23
17 Claims

ABSTRACT OF THE DISCLOSURE

The invention relates to a trail type agricultural hay harvesting machine of the mower-conditioner-windrower type having a main, wheeled frame extending and towable in a fore-and-aft direction, a header sub-frame unit pivotally mounted on the main frame, and receiving its implement drives from an improved drive system embodied therewith. Strategic design and embodiment of a pivotally mounted belt-drive unit and a fixed length universal drive shaft on the main frame, together with other drive line components provides a continuously effective drive system, resulting in the elimination or substantial reduction of angular acceleration and other torque load factors, irrespective of the various header positions.

BACKGROUND OF THE INVENTION

This invention relates to improvements in drive systems for agricultural machines commonly referred to as mower-conditioners and more particularly to the type of machine developed in recent years which will cut the standing crops, condition the crop material as by cracking and crushing the stems to facilitate drying and the like, will consolidate the material after it has been cut and conditioned, and then selectively deposit the material in a windrow or a swath as desired by the operator of the machine.

The prior art practice has provided pull type agricultural machines with PTO driven telescopic drive shaft means to automatically accommodate for shaft length and angular variations corresponding to different angular relationships of the towed machine to the draft vehicle and to settings of the various equipment drives carried therewith. In applying this practice to the more recently developed mower-conditioner-windrower machines, some problems emerged relative to the drive system due to excess torque and drag factors imparted to certain of the conventional telescopic drive shaft responsive to some relative angular settings of the vehicles or of the header unit, and which factors often caused ineffective extension or collapse of certain of the telescopic shafts. While the utilization of the best quality, more sophisticated, non-friction type of commercially available telescopic drive shafts results in usually very good performance, they add substantial costs thereto without always positively remedying the problem in this particular environment.

SUMMARY OF THE INVENTION

The present invention is directed to a pull or trail-type hay harvesting machine of the character described, comprising a wheel supported, generally L-shape, main frame; a header including a floating implement carrying sub-frame unit; implement driving means, wherein the improvement comprises the novel arrangement of a pivotal mounting of an intermediate belt drive unit which receives the drive from the PTO shaft in a substantially straight in-line manner, maintains a concept of parallelism of drive shaft components and which transmits power from the PTO shaft of the draft vehicle to the various drive components. The belt drive unit is constructed and pivotally mounted upon the main frame in such a manner as to maintain a general parallelism among the various misaligned component drive members, irrespective of the header setting. Further, the novel system utilizes a fixed length universal drive, in lieu of more costly telescopic drive for interconnecting that part of the drive line between the pivotal belt driven unit and the input shaft on the header which operatively connects the various component drives of the mower-conditioner-windrower implement, and is always operatively and effectively connected irrespective of the attitude of the header which may be remotely and selectively adjusted by the operator of the draft vehicle.

Accordingly, it is the primary object of this invention to provide an improved mower-conditioner machine of the pull or trail-type, having an improved drive mechanism for driving the various conditioning rolls, sickle, and pick-up reel means of the header, all in timed relation to each other from a power take-off means on the draft vehicle or tractor.

It is another principal object of this invention to provide a machine of the aforesaid character having an improved drive system whereby the various component drive and driven shafts are maintained in substantially parallel or in line relationship irrespective of the various attitudes to which the header may be adjusted under various conditions, thereby eliminating or substantially reducing angular acceleration or torque load factors in the system.

Another object of this invention is to provide a machine of the aforesaid character having an improved drive system which provides a nearly horizontal installation and a low angular disposition of the PTO attached universal drive shaft means irrespective of the various attitudes to which the header of the machine may be adjusted under various conditions.

It is a further object of the invention to provide a trail-type hay harvesting machine having a rugged mobile main frame, a floating header carrying sub-frame unit and header implement drive means all interrelated in an improved manner whereby the relationship of the header movement relative to the frame and to the drive line is such that responsive to header movement the attendant change in the drive train length between the tractor PTO and the belt drive unit is minimal, while that portion between the belt drive unit and the input gearbox on the header remains fixed but shiftable.

Still another object of the invention is to provide an improved drive system and header mounting for an agricultural machine according to the preceding paragraphs whereby an improved weight distribution is achieved throughout the frame structure enabling easier header adjustment with less torque requirement, and whereby the various drives for the respective elements are balanced for efficient operating capacity irrespective of the attitude or position of the header.

Other objects and advantages of this invention will become more apparent by reference to the detailed specification taken in conjunction with the illustrative drawings.

DESCRIPTION OF THE DRAWINGS

FIG. 5 is an enlarged cross sectional view of the belt drive unit as pivotally mounted on the main frame, and taken substantially on the irregular line 5—5 of FIG. 3; and FIG. 6 is a fragmentary plan assembly view of the gearbox and associated drive parts taken as indicated by the line 6—6 in FIG. 3, and with certain parts shown in cross section.

DESCRIPTION OF THE PREFERRED EMBODIMENT

Figure 1:
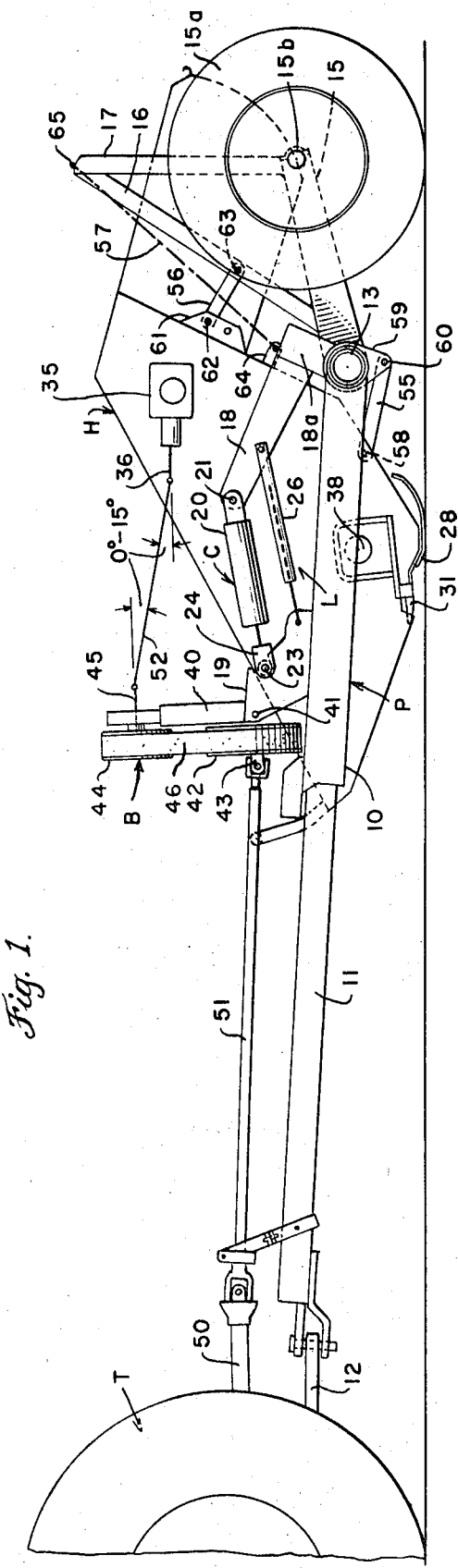
FIG. 1 is a semi-diagrammatic general side elevational view of a pull-type mower conditioner machine with the header thereof in its lowest operating position, and showing the machine connected to a draft tractor.

Referring now to the drawings in detail, the machine has a rugged, generally L-shaped, base frame of the pull-type and is generally designated P, and has mounted thereon a unitized sub-frame carried header designated generally H. The machine is intended to be pulled by a conventional farm tractor generally designated T (shown fragmentarily). The header H is pivotally mounted on the main frame and is adjustable for different attitudes with respect to the frame and to the ground by means of a piston-and-cylinder lifting means generally designated C. Power for driving the respective elements of the header is derived from the tractor PTO shaft and is transmitted through a novel drive system means including various roller chain drives, said drive system further comprising a pivotally mounted drive belt unit generally designated B, said drive belt unit B pivoting upon frame P in a manner shown by a comparison of FIGS. 1 and 2, attendant the various adjusted positions of the header.

More specifically, the pull-type unit P comprises an L-shaped, main frame including a fore-and-aft directed first leg portion designated generally at 10 and having a forwardly extending pivoted drawbar 11, the latter of which is pivotally attached also at its forward end to the conventional drawbar 12 affixed to a conventional tractor T. The main frame further includes a transversely extended tubular second leg 13 which is rotatable or rockable about its axis, and on which frame member 10 is pivotally mounted by a pair of sleeve bearings 14, 14; a pair of laterally spaced arms 15, 15, upon each of which is journalled a wheel 15a, project rearwardly behind the transverse frame leg 13 and are similarly pivotally mounted thereon; said arms 15, 15 serving as bases of a pair of composite triangular shaped, rigidly connected, wheel and header support frames constituted by said arms 15 and upright frame members 16 and 17. The latter triangular, rigid support frames are independently mounted and are pivotal about transverse rock shaft 13, and with the header H attached at least in part to the hypotenuse frame member 16, as will be described in more detail. When the frame is adjusted responsive to rocking or rotating transverse leg 13 to achieve header adjustment, said frame pivots upwardly about the axis 15b of the ground supporting wheels 15a, as seen by a comparison of FIGS. 1 and 2.

Figure 2:
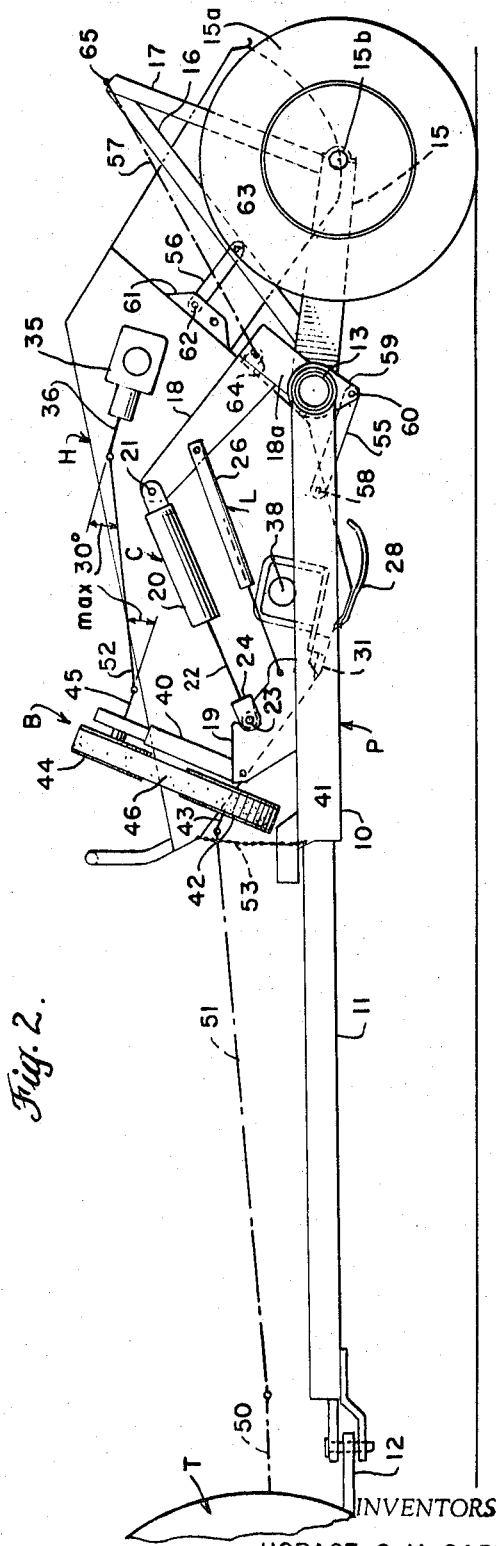
FIG. 2 is a view similar to that of FIG. 1 showing the header in its fully raised transport position.

The means for lifting the header from the operating position of FIG. 1 to the raised transport position of FIG. 2, and for affecting the attendant attitude change of the triangular frame, includes the piston device C, a heavy duty, bellcrank type lift arm 18 having one end welded to the rock shaft 13 by means of a weld bracket 18a, and a fixed support bracket 19 secured on a forward portion of the main frame 10, disposed in aligned spaced relation to arm 18. The piston device C interposed between these lift and support brackets comprises a conventional hydraulic cylinder 20 and piston 22, with the cylinder 20 being pivotally connected to the lifting arm 18 by means of a pin 21, and with the piston 22 (FIG. 4) connected by means of pin 23 to composite bell crank link means 24, said link pin 23 selectively resting in a recessed arcuate notch 23a in the upper part of bracket 19. Link means 24 preferably comprises split arms straddling the bracket 19 and pivotally mounted to the bracket 19 by means of pin 25, better seen in FIG. 3. In spaced relation beneath the cylinder assembly C, there is a telescopic link assembly L attached to the bracket 19 and to the lift arm 18, and which comprises part of a locking means to selectively lock the header in a raised condition for transport or service purposes.

Proceeding to the header H, it comprises generally a sub-frame 27 having a pick-up reel R including a plurality of transversely extended and circumferentially spaced tine carrying arms 30; a sickle type mower designated S having the reciprocable cutter means 31 and a wobble driving head 38 mounted on the sub-frame adjacent the ground and extending transverse to the direction of travel. The wobble drive to the sickle translates the rotary motion of the shaft mounted pulley 75 into reciprocable motion for the sickle S. A pair of adjustably mounted skid shoes 28 are attached beneath the sickle cutter assembly S in laterally spaced relation. The shoe adjustment features, while not shown in this application, provide for a plurality of preferably three or four positions which selectively permit the cutter bar and header to be elevated in small progressive increments above the ground to accommodate crops of varying height and which will effectively vary the angle of the drive components to be described. Reference may be made to assignee's copending application Ser. No. 612,462 filed Jan. 30 1967, for details of the skid shoe and related means.

The header further includes upper and lower infeed crop-conditioning rolls 32 and 33 suitably supported and respectively having appropriate drive shafts and sprockets which will be further clarified, and an inclined floor plate 34 disposed transversely to the direction of travel of the machine and behind the sickle cutter for receiving and upwardly deflecting the cut crop material toward the conditioning rolls 32, 33. Also mounted on the header, on the same side as the fore-and-aft leg 10 of the main frame is a right angle gearbox unit 35. Gearbox unit 35 includes the conventional bevel gears for transmitting power from the tractor PTO to the various drive components of the header by means of the power input shaft 36 and an output shaft 37.

Attachment and suspension of the unitized header H to the pull unit P, is accomplished by means of a pair of independent links at each lateral side thereof. The lower links 55 are connected at their respective forward ends to suitable brackets on the underside of the header by means of a pin 58, and at the rearward end to vertically depending lug arms 59—59, attached to rotatable frame tube 13, by means of pins 60. The upper links 56 are connected at their forward ends to uppermost mounting holes of attachment ears 61 on the header by means of a pin 62, and by pins 63 at their rearward end to a medial portion of hypotenuse frame member 16. The mounting ears are preferably attached to the header frame in predetermined relation so that the preformed pair of adjustment holes provide selective use depending upon whether the assembly is being made for a pull-type or a self-propelled type of machine. The header unit is resiliently suspended upon the main frame by means of a plurality of flotation springs 57 disposed at opposite sides of the frame, preferably in pairs, and connected at their lower ends to lugs 64 of the header and at their upper ends to lateral brackets 65 attached to the upper ends of each triangular frame. The springs serve to counterbalance the weight of the header.

It is apparent from the foregoing that this construction enables the header to floatingly follow the contour of the ground due to the independent mounting of each wheel and each side of the header. Due to the low disposition of the pivot points of the wheels and transverse leg 13, this unique suspension enables the pull of the tractor vehicle to impart a lifting action to the header and together with its angular skids 28 precludes gouging of the cutter sickle into the ground.

Proceeding now to the drive system in more detail, the pivotally mounted drive belt unit B will be described. Unit B, better seen in FIGS. 3, 4 and 5, comprises a supporting bracket 40 angularly disposed in a lateral manner (FIG. 5) for axial alignment of the upper drive means thereof with the input shaft 36 of gearbox 35, and pivotally mounted in a fore-and-aft manner at 41 in the fixed support bracket 19 of frame member 10. A drive pulley 42 is secured on a drive shaft 43 which, in turn, is journalled in the lower portion of the bracket 40, while at the upper end thereof, and attached to a slidable portion 39 of the bracket, is a driven pulley 44 affixed to driven shaft 45, the latter of which is journalled within said bracket means and disposed parallel to shaft 43. A drive belt 46 operatively connects the pulleys 42 and 44. The belt unit B is designed so that the lower input drive shaft 43 is disposed in such a manner that a universal shaft 51 connecting it and the tractor PTO lies substantially over the pivotal drawbar 11, for two reasons. If the drive belt unit were constructed in a truly vertical manner the lower input shaft 43 would then be substantially offset to the right of the drawbar 11, thus increasing the angle of the universal drive 51 from the PTO during harvesting operations in the field. Further, with the shaft offset in this manner, it would be susceptible to damage by the tractor wheel during sharp right hand turns.

Means is provided for adjusting the tension on said belt by adjusting portion 39 of bracket 40 relative thereto as by adjusting screw 47 having its shank threadedly engaged in sub-bracket 48, and its head engaging the offset bracket plate 49 attached to the lower end of bracket portion 39.

This drive belt unit B receives its drive from the tractor PTO shaft 50 which is drivingly connected to the drive shaft 43 of said unit B by means of the substantially horizontally disposed, telescopic universal shaft 51 interposed therebetween. The upwardly spaced, driven shaft 45 of unit B is drivingly connected to the input shaft 36 of the gearbox 35 by means of a fixed length universal shaft 52. While the drawings have shown the skid shoes 28 as they would appear in the lowest cutter bar or number one adjusted position, when progressively elevated by adjustment to the number two and three positions, the relative angle of the universal shaft 52 with respect to the belt drive unit output shaft 45 and the input shaft 36 of the gearbox 35 is progressively lessened to provide a more nearly straight line drive. It is to be noted that the disposition of the respective drive elements is such that the respective drive shafts are always maintained in parallel and with the universals disposed to phase out any potential angular acceleration. Irrespective of the header attitude between lowered operating condition and the raised road-transport position, the angles generated by the universal shaft relative to the other shafts 45 and 36 are always equal but opposite, due to the parallelism being maintained. The progressive lowering of the skid shoes 28 provides means for effecting selective adjustment of said shaft 52 to dispose it at varying angles with respect to a horizontal plane through either of said shafts 45 and 36, within a range of from 0 degrees to 15°. The approximate maximum angle of shaft 52 with respect to said shafts 45 and 36 is 30° when the header unit is in the fully raised condition, with restraining means provided in the form of a chain 53 (FIG. 2) at one (left) side of the header being used to preclude inadvertent raising of the header beyond this desired point. By comparing the relative positions of the drive shafts, as viewed in FIGS. 1, 2, and 4, the role that the shafts 51 and 52 and unit B play is apparent, by providing substantially horizontal in-line connection of the PTO with shaft 43 when the header is in the operative lowered condition, and only a slight inclined angular connection therewith when the header is in the fully raised inoperative condition. Further, this arrangement provides very efficient, uninterrupted drive to the various drive components on the header without the need for expensive telescopic drive shafts, irrespective of the selective attitude of the header and without imparting severe angular torque or drag loads to the various universal connections when in either the road transporting, substantially tandem position or in the laterally offset, trailing field harvesting position.

Figure 3:
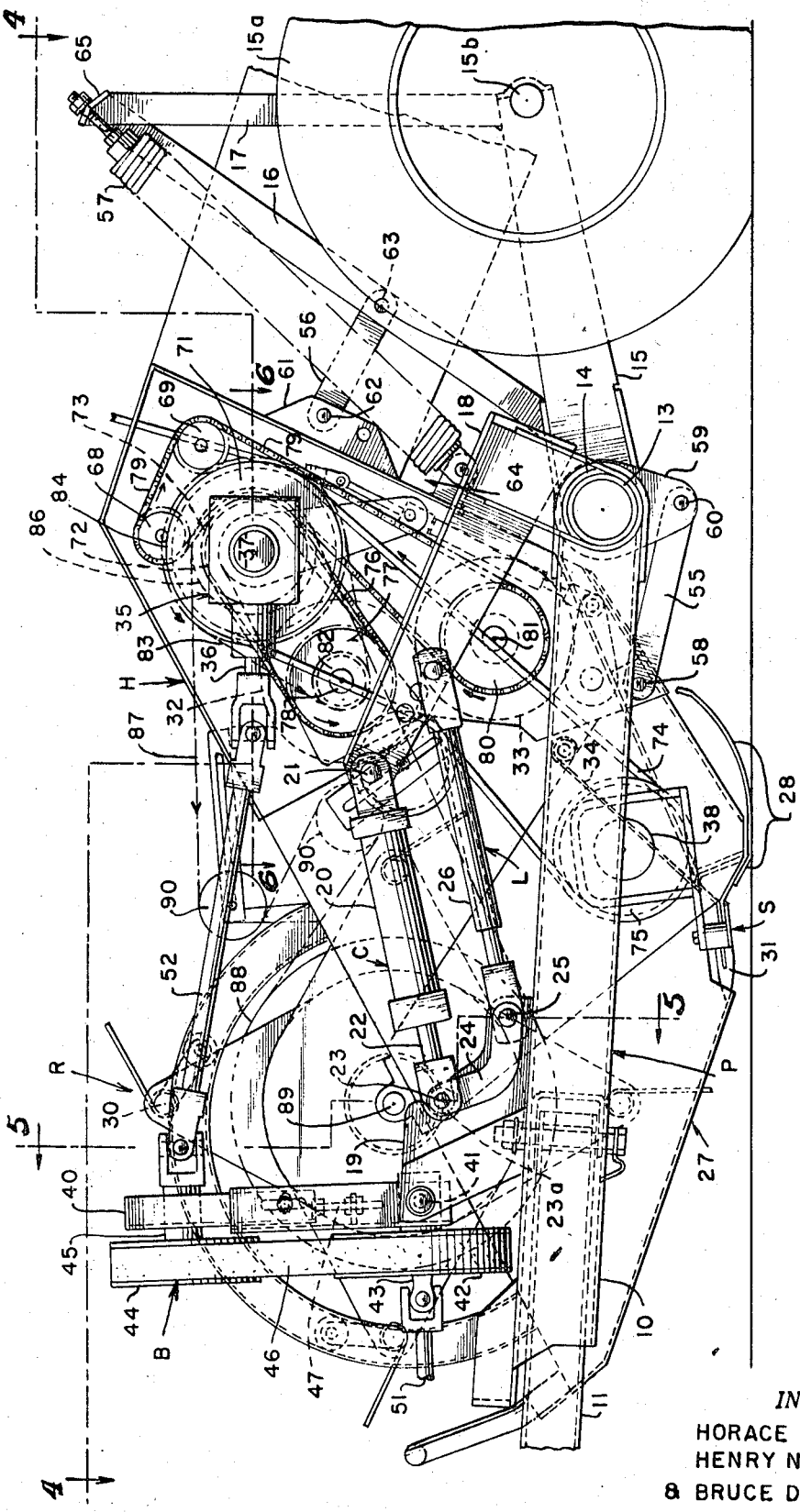
FIG. 3 is an enlarged fragmentary side elevational view of the header portion of the implement with the cover plate in the conditioner roll area removed to better show otherwise hidden components.
Figure 4:
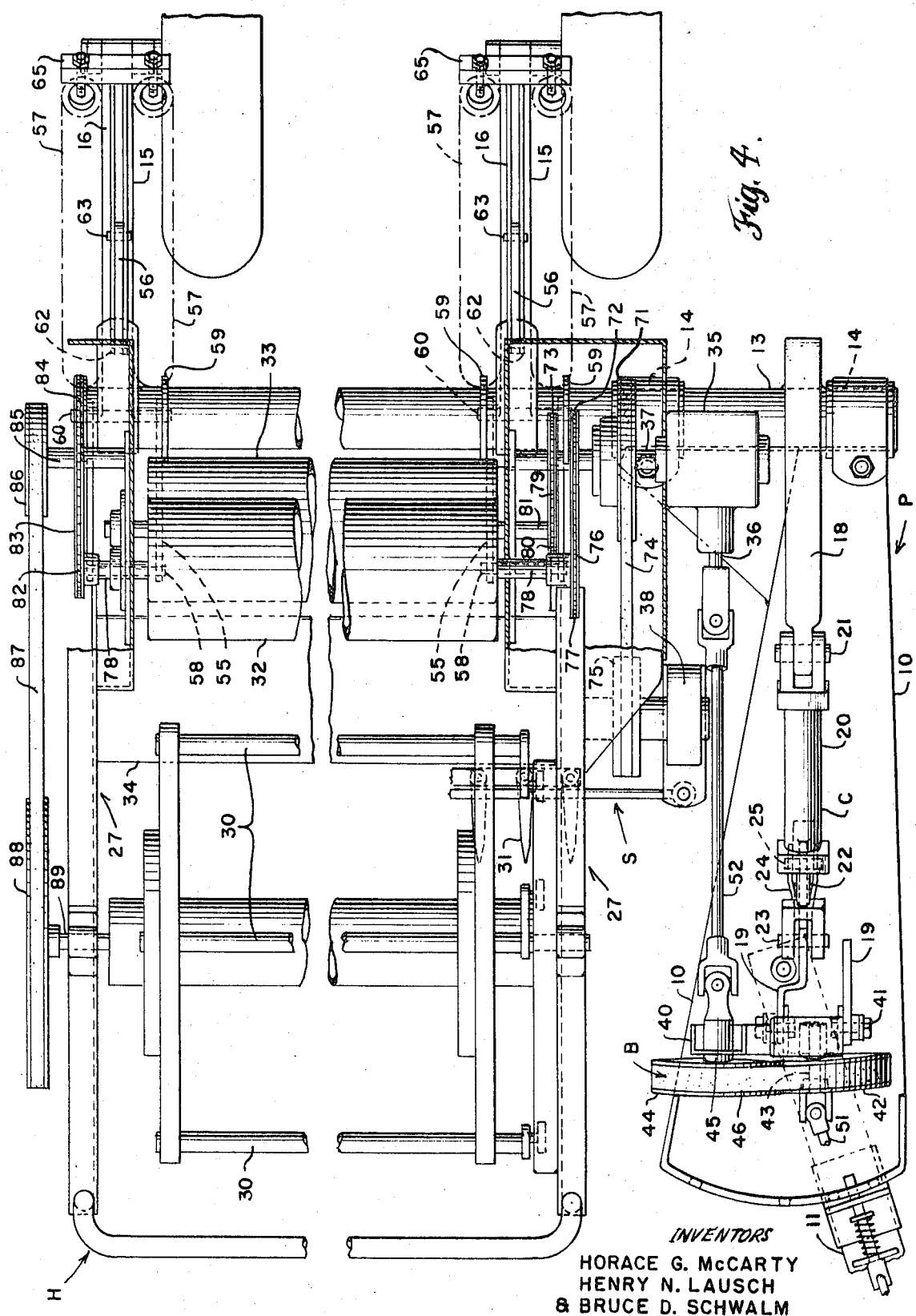
FIG. 4 is a top plan view of the implement of FIG. 3, but having a central broken away portion to enable the view to be depicted on the enlarged scale in a clear manner, said figure taken approximately on the irregular line 4—4 of FIG. 3.

Referring more particularly to the additional drive components of FIGS. 3, 4, and 6, the input shaft 36 of gearbox 35 drives the main output shaft 37 which is suitably journalled in the header framework. Shaft 37 is provided with a plurality of drive members in laterally spaced relation including a drive pulley 71 and drive sprockets 72 and 73. A drive belt 74 connects pulley 71 with an aligned driven pulley 75 mounted in association with and for imparting drive via wobble unit 38 to the cutter 31 of the sickle unit S. An adjustable idler pulley 70 (FIG. 3) is provided for engagement with belt 74 to maintain proper tension on the belt. Moving inward to the sprocket 72, an endless drive chain 76 operably connects it with aligned sprocket 77 mounted on the outer end of shaft 78 of the upper conditioning roll 32 to impart counterclockwise rotation thereto, as viewed in FIG. 3. Similarly, a drive chain 79 imparts opposite, clockwise rotation from drive sprocket 73 to aligned driven sprocket 80 secured to the outer end of shaft 81 of lower conditioning roll 33. The opposite and clockwise rotation is achieved by directing chain 79 over a pair of reversing idler sprockets 68 and 70 (FIG. 3) before embracing sprocket 80. FIG. 6 shows an adjustable bell crank mounting means 66 for supporting the upper roll 32, and the associated adjusting means 67 for effecting adjusting of upper roll 32 relative to lower roll 33.

On the opposite end of the upper roll shaft 78 there is a relatively small diameter drive sprocket 82 (FIG. 4) which imparts the same counterclockwise rotation via endless chain 83 to a larger diameter driven sprocket 84 secured on a rotatably mounted stub shaft 85 mounted on that opposite side of the header and preferably in axial alignment with output shaft 37 of the gearbox 35. Also mounted outwardly of and on the same shaft 85 is a drive pulley 86 which imparts counterclockwise drive rotation to the pick-up reel R via endless drive belt 87 engaging pulley 86 and larger driven pulley 88 attached on the reel shaft 89. The reel R is disposed generally above and slightly forward of the cutting sickle S, and the counterclockwise drive of the reel is necessary to enable the tines of the reel arms or bars 30 to sweep the crop material rearwardly over the sickle S. A pair of idler pulleys 90 (FIG. 3) are adjustably mounted on the header frame preferably are interposed in the reel drive for tensioning purposes.

Accordingly, with the drive arrangement shown and described, the driving components are effectively and efficiently driven at all times when the power is applied from the prime source PTO of the tractor. By utilizing the improved drive system embodying the pivotal belt drive unit or tower and appurtenant drives as described, an improved drive system has been evolved which will absorb and transmit greatly reduced angular drive torques at a reduced cost, by eliminating the need for some of the more sophisticated and costly telescopic drive shafts.

While this invention has been described in connection with a particular embodiment thereof, it will be understood that it is capable of modification, and this application is intended to cover any variations, uses, or adaptations following, in general, the principles of the invention and including such departures from the present disclosures as come within known or customary practice in the art to which the invention pertains, and as fall within the scope of the invention or the limits of the appended claims.

Having thus described our invention, what we claim is:

1. An agricultural harvesting machine adaptable to be moved in a fore-and-aft direction by a prime power source vehicle having power take-off means, said machine comprising in combination:
- (a) a main frame having means for supporting the machine on the ground;
- (b) a unitary subframe and header unit extending laterally of and means pivotally mounting said unit on said frame for pivotal movement transverse to the fore-and-aft direction between a lowered operating position and a raised transport position;
- (c) said header including crop harvesting means extending transversely of the frame;
- (d) a gearbox mounted on the header frame having a power input shaft and a power output shaft connected to said crop harvesting means; and
- (e) intermediate drive means for interconnecting said power input shaft to the power take-off of a tractor and including a planar rotary drive means extending generally vertically and parallel to said predetermined axis and with rotary input means for connection to a tractor power takeoff and rotary output means, a dual universal drive means interconnecting said output means and said power input shaft and having two angularities for adjusting to different relationships of said output means and power input shaft pivotal mounting means said rotary drive means to turn about a transverse axis at the level of said rotary input means to tilt said output means with the header while maintaining the angularities of the dual universal drive means in substantial equality over a range of positions of said header.

2. An agricultural harvesing machine as set forth in claim 1 wherein said rotary input means is below said rotary output means and said pivotal mounting means has the transverse axis at the lower level of said rotary input means so that said upper rotary output means swings through an arc on raising and lowering of said header.

3. The machine as defined in claim 2, wherein the lower input shaft is disposed in substantially level alignment with the tractor power take-off, with respect to a horizontal plane.

4. The machine as defined in claim 2, wherein said upper output means, said universal drive means, said input shaft of the gearbox are disposed in a straight fore-and-aft alignment at all times.

5. The machine as defined in claim 2, wherein said input means has a central input shaft disposed in substantially level alignment with the tractor power take-off, with respect to a horizontal plane, said upper output means has a central output shaft, and said universal drive means interconnects the output shaft thereof with the input shaft of the gearbox, said shafts of the rotary drive and driven means being disposed in parallel to each other and to the input shaft of the gearbox.

6. The machine as defined in claim 5, wherein said universal drive means has a universal drive shaft at an angle within the range of from zero degrees to fifteen degrees with respect to a horizontal plane through either of said other shafts.

7. The machine as defined in claim 1, wherein said rotary drive means of said means intermediate drive means is a drive pulley and a driven pulley mounted in coplanar relation on said frame and a drive belt interconnecting said pulleys.

8. An agricultural harvesting machine as defined in claim 1, wherein said intermediate drive means comprises a first universal drive shaft means for connecting the power takeoff with said first rotary input means, and said universal drive means has a second universal shaft means connecting the second rotary output means with the input shaft of the gearbox.

9. An agricultural harvesting machine as defined in claim 8, wherein the first universal drive shaft is disposed substantially horizontally with the first rotary input means, the second universal drive shaft means is disposed in substantially straight fore-and-aft alignment in a vertical plane with the second rotary output means of the drive unit and the input shaft of the gearbox.

10. An agricultural harvesting machine as defined in claim 8, including means for effecting the alignment of the the second universal drive shaft means whereby the axis thereof is disposed at a maximum angle of approximately 15 degrees with respect to the axes of both the rotary output shaft of the drive unit and to the input shaft of the gearbox when the subframe is in the lowered operative position.

11. An agricultural harvesting machine as defined in claim 8, including means for effecting the alignment of the second universal drive shaft means whereby the axis thereof is disposed at a maximum angle of approximately 15 degrees with respect to the axes of both the rotary output shaft of the drive unit and to the input shaft of the gearbox when the subframe is in the lowered operative position; and at a maximum angle of approximately 30 degrees with respect to the respective shafts when the subframe is in the fully raised position.

12. An agricultural harvesting machine as defined in claim 1, wherein the crop harvesting means includes:
- (a) a crop moving means carried by said subframe for close ground disposition when in the operative position;
- (b) a pair of complementary crop conditioning rolls carried by said subframe behind, parallel to and slightly above said mowing means; and
- (c) a crop gathering reel journalled in said subframe above, forwardly of and extending parallel to said mowing means and disposed forwardly of and parallel to said rolls.

13. An agricultural harvesting machine as defined in claim 12, wherein the means drivingly connecting the power output shaft of the gearbox to the crop harvesting means includes first, second and third endless drive means connecting said output shaft to said mowing means, said conditioning rolls and said reel respectively.

14. An agricultural harvesting machine as defined in claim 13, wherein the first and second endless drive means are directly driven from the output shaft of the gearbox, and the third endless drive means is indirectly driven thereby via means associated with said second drive means.

15. A mower conditioner for pulling in a forward direction by a tractor having a power takeoff comprising:
- (a) a header having a mower, reel and conditioning rolls extending transverse to the line of travel,
- (b) means pivotally mounting said header on said frame for pivotal movement transverse to the forward direction,
- (c) a gearbox mounted on said header spaced from said mounting means having output drive means connected to said mower, reel and conditioning rolls and an input shaft,
- (d) intermediate drive means having rotary power transfer means for connection to a power takeoff of a tractor and with a rotary output shaft and with means responsive to header positions, a shaft, two universal joints connecting said shaft at opposite ends to said input shaft and said rotary output shaft for driving said gearbox and ajusting to different relationships of said rotary output shaft and said power input shaft by variation of said header position responsive means to maintain the respective angularities of said universal joints in substantial equality for each position of said header.

16. A mower conditioner as set forth in claim 15 wherein said rotary power transfer means has a planar rotary drive means extending generally vertically and transversely and having a lower input shaft connectable to a power takeoff means and said rotary output shaft being an upper shaft and said means responsive to header positions being pivotal means supporting said rotary drive means to turn about an axis parallel to said predetermined axis at the level of said lower shaft of said rotary drive means to tilt said rotary drive means with movement of said header to maintain the angularity of said universal joints substantially equal over the range of tilts.

17. A drawn agricultural implement adapted to be propelled forwardly by a prime power source vehicle having power takeoff shaft means, said implement comprising, in combination:
- a ground supported frame adapted to travel forwardly,
- a header extending transverse to forward travel and having power driven crop harvesting means and being mounted for pivotal movement transverse to the fore-and-aft direction on said frame,
- a gearbox with means mounting said gearbox on said header and having an output shaft extending transversely and drivingly interconnected with said crop harvesting means and an input shaft extending forwardly and drivingly coupled by said gearbox to said output shaft,
- a forwardly positioned rotary power transmitting shaft extending in the fore-and-aft direction,
- means for mounting said rotary power transmitting shaft on said frame,
- a shaft with universal joints connected respectively to said rotary power transmitting shaft and said input shaft for transmitting rotary power from the power takeoff shaft means on a drawing vehicle, and
- means for pivotally interconnecting said mounting means of said input shaft and said rotary power transmitting shaft to maintain the angularities of said universal joints substantially equal over the range of the mowing operative positions of said header.

References Cited
UNITED STATES PATENTS

| | | | |
|---|---|---|---|
| 2,895,277 | 7/1959 | Scarnato et al. | 56—25 |
| 3,375,643 | 4/1968 | McCarty et al. | 56—23 |

ANTONIO F. GUIDA, Primary Examiner

U.S. Cl. X.R.

56—1